United States Patent
Bai et al.

(12) 
(10) Patent No.: US 10,733,233 B2
(45) Date of Patent: Aug. 4, 2020

(54) METHOD AND APPARATUS FOR GENERATING SITUATION AWARENESS GRAPHS USING CAMERAS FROM DIFFERENT VEHICLES

(71) Applicant: GM GLOBAL TECHNOLOGY OPERATIONS LLC, Detroit, MI (US)

(72) Inventors: Fan Bai, Ann Arbor, MI (US); Mohannad Murad, Troy, MI (US); Joseph G. Machak, Oakland Township, MI (US); Wende Zhang, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 147 days.

(21) Appl. No.: 15/950,917

(22) Filed: Apr. 11, 2018

(65) Prior Publication Data

US 2019/0318041 A1     Oct. 17, 2019

(51) Int. Cl.
| | |
|---|---|
| *G06F 16/901* | (2019.01) |
| *B60W 40/04* | (2006.01) |
| *H04W 4/46* | (2018.01) |
| *G06K 9/62* | (2006.01) |
| *G06K 9/00* | (2006.01) |
| *B60W 30/095* | (2012.01) |

(52) U.S. Cl.
CPC ......... *G06F 16/9024* (2019.01); *B60W 40/04* (2013.01); *G06K 9/00791* (2013.01); *G06K 9/6278* (2013.01); *H04W 4/46* (2018.02); *B60W 30/0956* (2013.01); *G05D 2201/0213* (2013.01)

(58) Field of Classification Search
CPC .................. H04W 4/46; G05D 1/0088; G05D 2201/0213; B60W 30/0956; G06K 9/00791
See application file for complete search history.

(56) References Cited

U.S. PATENT DOCUMENTS

| | | | |
|---|---|---|---|
| 2014/0195138 A1* | 7/2014 | Stelzig | ................. G08G 1/0116 701/119 |
| 2018/0173229 A1* | 6/2018 | Huang | .................... H04W 4/70 |

* cited by examiner

*Primary Examiner* — Ross Varndell
(74) *Attorney, Agent, or Firm* — Lorenz & Kopf, LLP

(57) ABSTRACT

In various embodiments, methods, systems, and vehicles are provided that include obtaining first camera images from a first camera onboard a first vehicle; generating, via one or more computer processors, a first situation awareness graph with respect to objects near the first vehicle, using the first camera images; obtaining second camera images from a second camera of a second device that is in proximity to the first vehicle; generating, via one or more computer processors, a second situation awareness graph with the respect to the objects, using the second camera images; and generating, via one or more computer processor, a global situation awareness graph with respect to the objects, by merging the first situation awareness graph with the second situation awareness graph, using respective first and second weights for the first and second situation awareness graphs.

15 Claims, 7 Drawing Sheets

METHOD AND APPARATUS FOR GENERATING SITUATION AWARENESS GRAPHS USING CAMERAS FROM DIFFERENT VEHICLES

TECHNICAL FIELD

The technical field generally relates to the vehicles and, more specifically, to methods and systems for generating situation awareness graphs using cameras from different vehicles.

BACKGROUND

Many vehicles include various systems for improved operation of the vehicle, including use of cameras for detecting objects and other surroundings in proximity to the vehicle. However, in certain situations, a vehicle's cameras may be occluded or blocked by other obstacles on the road, and/or one or more other conditions may be present that may make it difficult for a camera of a single vehicle to ascertain situations awareness for the vehicle.

Accordingly, it is desirable to provide improved methods and systems to facilitate situation awareness for a vehicle having a camera. Furthermore, other desirable features and characteristics of the present invention will become apparent from the subsequent detailed description of the invention and the appended claims, taken in conjunction with the accompanying drawings and this background of the invention.

SUMMARY

In one exemplary embodiment, a method is provided that includes: obtaining first camera images from a first camera onboard a first vehicle; generating, via one or more computer processors, a first situation awareness graph with respect to objects near the first vehicle, using the first camera images; obtaining second camera images from a second camera of a second device that is in proximity to the first vehicle; generating, via one or more computer processors, a second situation awareness graph with the respect to the objects, using the second camera images; and generating, via one or more computer processor, a global situation awareness graph with respect to the objects, by merging the first situation awareness graph with the second situation awareness graph, using respective first and second weights for the first and second situation awareness graphs.

Also in one embodiment, the step of generating the first situation awareness graph includes generating a first static situation awareness graph with respect to objects near the first vehicle at a particular time, using the first camera images; the step of generating the second situation awareness graph includes generating a second static situation awareness graph with respect to the objects at the particular time, using the second camera images; and the step of generating the global situation awareness graph includes generating a static global awareness graph with respect to the objects at the particular time, by merging the first static situation awareness graph with the second static situation awareness graph, using respective first and second weights for the first and second static situation awareness graphs.

Also in one embodiment, the step generating the static global situation awareness graph includes generating the static global situation awareness graph using the respective first and second weights for the first and second static situation awareness graphs based on a principal components analysis of respective Mahalanobis Distances from the first and second static situation awareness graphs.

Also in one embodiment, the step of generating the global situation awareness graph includes generating, via one or more computer processors, a time-evolving dynamic global situational awareness map with respect to the objects using the first situation awareness graph and the second situation awareness graph over multiple periods of time, using respective first and second weights for the first and second situation awareness graphs.

Also in one embodiment, the step of generating the global situation awareness graph includes generating, via one or more computer processors, a multi-layer dynamic bipartite graph for predicting the trajectory of detected objects, using the first situation awareness graph and the second situation awareness graph over multiple periods of time, using respective first and second weights for the first and second situation awareness graphs.

Also in one embodiment, the step of generating the global situation awareness graph includes generating, via one or more computer processors, a multi-layer dynamic probabilistic graph for predicting the trajectory of detected objects, using initial and posterior probabilities from the first situation awareness graph and the second situation awareness graph over multiple periods of time, utilizing a Bayesian particle filter.

Also in one embodiment, the second device includes a second vehicle that is in proximity to the first vehicle.

Also in one embodiment, the second device includes infrastructure that is in proximity to the vehicle.

Also in one embodiment, the method further includes: estimating, via one or more processors, one or more parameters as to one or more occluded vehicles of the detected objects, based on the global situation awareness graph; and controlling the first vehicle, the second vehicle, or both, in a manner to avoid contact with the one or more occluded vehicles, using the one or more parameters that were estimated based on the global situation awareness graph.

In another exemplary embodiment, a system is provided that includes: a first camera onboard a first vehicle, the first camera configured to generate first camera images from the first vehicle; and one or more computer processors configured to at least facilitate: generating a first situation awareness graph with respect to objects near the first vehicle, using the first camera images; and generating a global situation awareness graph with respect to the objects, by merging the first situation awareness graph with a second situation awareness graph that was generated using second camera images from a second camera of a second device that is in proximity to the first vehicle, using respective first and second weights for the first and second situation awareness graphs.

Also in embodiment, the system further includes a transceiver configured to receive the second camera images from the second device, the second situation awareness graph, or both.

Also in one embodiment, the second device includes a second vehicle that is in proximity to the first vehicle, and the transceiver is further configured to transmit, via instructions from the one or more computer processors, the first camera images, the first situation awareness graph, or both, for use by the second vehicle.

Also in one embodiment, the one or more processors are configured to at least facilitate: generating a first static situation awareness graph with respect to objects near the first vehicle at a particular time, using the first camera images; generating a second static situation awareness graph with respect to the objects at the particular time, using the second camera images; and generating a static global awareness graph with respect to the objects at the particular time, by merging the first static situation awareness graph with the second static situation awareness graph, using respective first and second weights for the first and second static situation awareness graphs.

Also in one embodiment, the one or more processors are configured to at least facilitate generating the static global situation awareness graph using the respective first and second weights for the first and second static situation awareness graphs based on a principal components analysis of respective Mahalanobis Distances from the first and second static situation awareness graphs.

Also in one embodiment, the one or more processors are configured to at least facilitate generating a time-evolving dynamic global situational awareness map with respect to the objects using the first situation awareness graph and the second situation awareness graph over multiple periods of time, using respective first and second weights for the first and second situation awareness graphs.

Also in one embodiment, the one or more processors are configured to at least facilitate generating a multi-layer dynamic bipartite graph for predicting the trajectory of detected objects, using the first situation awareness graph and the second situation awareness graph over multiple periods of time, using respective first and second weights for the first and second situation awareness graphs.

Also in one embodiment, the second device includes a second vehicle, and the one or more processors are configured to at least facilitate: estimating one or more parameters as to one or more occluded vehicles of the detected objects, based on the global situation awareness graph; and controlling the first vehicle, the second vehicle, or both, in a manner to avoid contact with the one or more occluded vehicles, using the one or more parameters that were estimated based on the global situation awareness graph.

In another exemplary embodiment, a vehicle is provided that includes a first camera and one or more computer processors. The first camera is onboard the vehicle, the first camera configured to generate first camera images from the vehicle; and one or more computer processors configured to at least facilitate: generating a first situation awareness graph with respect to objects near the vehicle, using the first camera images; and generating a global situation awareness graph with respect to the objects, by merging the first situation awareness graph with a second situation awareness graph that was generated using second camera images from a second camera of a second device that is in proximity to the vehicle, using respective first and second weights for the first and second situation the first camera images.

Also in one embodiment, the vehicle further includes a transceiver configured to receive the second camera images from the second device, the second situation awareness graph, or both, and to transmit, via instructions from the one or more computer processors, the first camera images, the first situation awareness graph, or both, for use by the second device.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
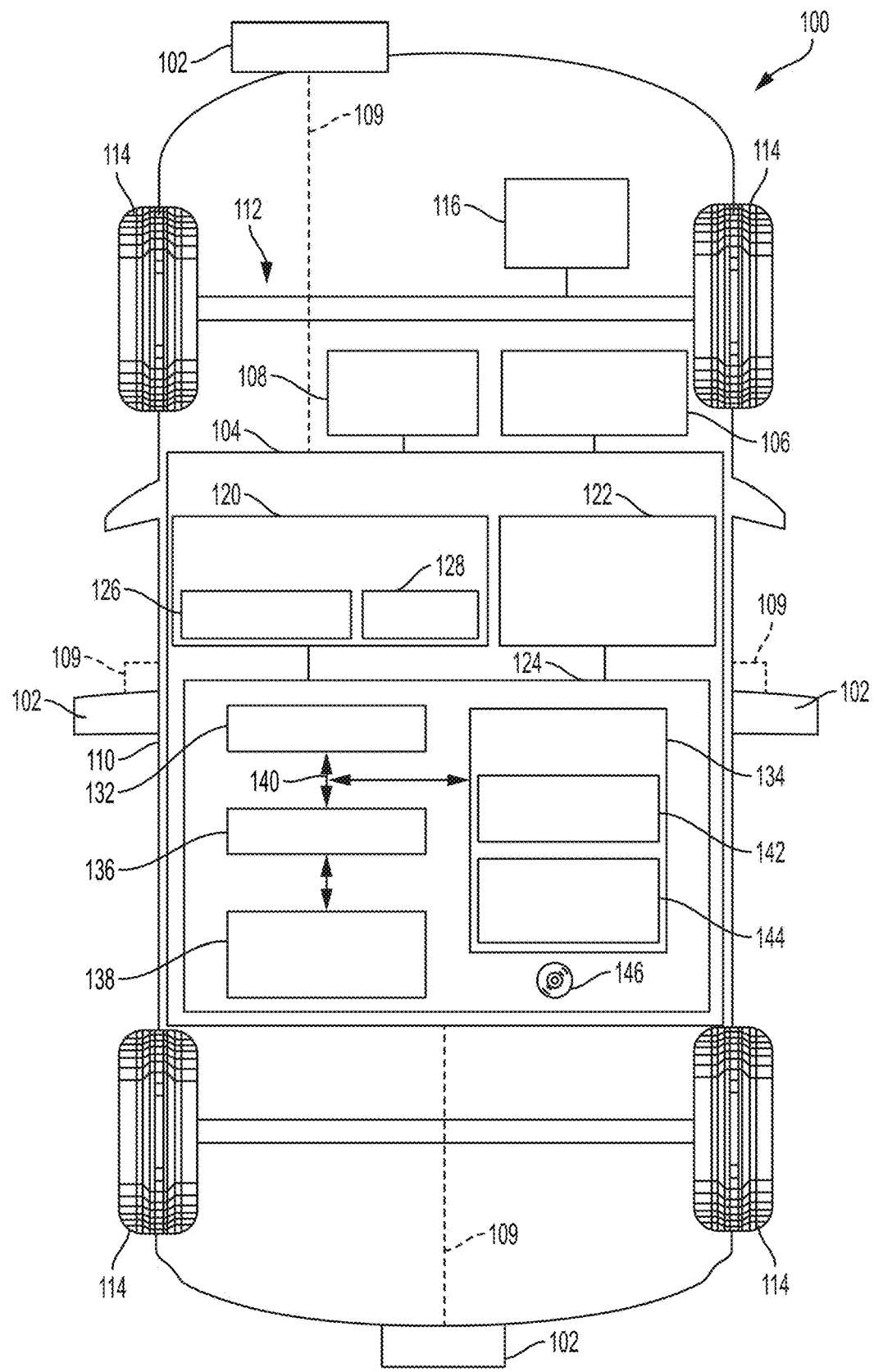
FIG. 1 is a functional block diagram of a vehicle that includes cameras and a control system for facilitating control of the vehicle using the cameras of the vehicle and information from one or more other cameras that are remote from the vehicle.

FIG. 1 illustrates a vehicle 100, according to an exemplary embodiment. As described in greater detail further below, the vehicle 100 includes cameras 102, a control system 104, and a display 108 (also referred to herein as a display device). Also, as depicted in FIG. 1, in certain embodiments the vehicle 100 also includes a navigation system 106.

In certain embodiments, the cameras 102 are controlled via a control system 104, as depicted in FIG. 1. Also in certain embodiments, the control system 104 is also coupled to the navigation system 106 and the display 108. In various embodiments, the control system 104 provides various control actions for the vehicle 100, including images from the cameras 102 as well as from cameras from other nearby vehicles and/or infrastructure and/or other information from another vehicle for display on the display 108, and controlling travel of the vehicle 100 as appropriate, such as to avoid contact with other vehicles and/or other objects (e.g., by automatically controlling braking and/or steering of the vehicle 100, as appropriate). In addition, in various embodiments, the control system 104 also assists in providing camera images and other information to other nearby vehicles and/or infrastructure. In various embodiments, the control system 104 provides these and other functions in accordance with the implementation, process, and illustrations discussed further below in connection with FIGS. 2-6.

In various embodiments, the vehicle 100 preferably comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, and/or one or more other types of mobile platforms (e.g., a robot, a ship, and so on) and/or other systems, for example having a camera image with a fixed referenced point.

The vehicle 100 includes the above-referenced body 110 that is arranged on a chassis 112. The body 110 substantially encloses other components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in certain embodiments, the cameras 102 include a rear vision camera that is mounted on a rear portion of the vehicle 100, a front vision camera that is mounted on a front portion of the vehicle 100, a driver side camera that is mounted on a driver side of the vehicle 100, and a passenger side camera that is mounted on a passenger side of the vehicle. In various embodiments, the cameras 102 provide images from around the vehicle, for example from various sides of the vehicle 100 (e.g., front side, rear side, passenger side, and driver side), for example to assist the vehicle 100 and/or other nearby vehicles in travelling along a roadway (e.g., to avoid contact with other vehicles and/or other objects). In certain embodiments, cameras 102 may also be disposed on one or more other locations of the vehicle 100, for example on top of the vehicle 100, for example to create a surround view and/or one or more other views for the vehicle 100. In various embodiments, the number, locations, and/or placement of the cameras 102 may vary (e.g., in certain embodiments, a single camera may be used, and so on).

The cameras 102 provide images for viewing on one or more displays 108 that are disposed inside the vehicle 100 (i.e. inside the body 110 of the vehicle 100). In addition, in various embodiments, the camera images are also transmitted to one or more other vehicles. In addition, in certain embodiments, the camera images are also provided to a vehicle control system for use in vehicle control, and so on.

In various embodiments, the navigation system 106 provides location information for the vehicle 100. For example, in various embodiments, the navigation system 106 comprises a satellite-based system, such as a global positioning system (GPS) and/or other satellite-based system, and provides location information regarding a current position of the vehicle 100. In certain embodiments, the navigation system 106, and/or one or more components thereof, may be disposed within and/or be part of the control system 104. In other embodiments, the navigation system 106 may be coupled to the control system 104.

In various embodiments, the display 108 displays images, such as from the cameras 102 of the vehicle 100, and in certain embodiments also from respective cameras from other vehicles. In one embodiment, the display 108 is located on a center console of the vehicle 100. However, this may vary in other embodiments. In various other embodiments, the display 108 may be part of a radio display, a navigation display, and/or other display, for example as part of or in proximity to the center console. In certain other embodiments, the display 108 may be part of one or more other vehicle components, such as a rear view mirror. In one exemplary embodiment the display 108 comprises a liquid crystal display (LCD) screen or a light emitting diode (LED) screen. However, this may vary in other embodiments.

The control system 104 controls operation of the cameras 102, and generates situation awareness graphs and instructions for control of the vehicle 100 based on data from the cameras 102 of the vehicle 100 as well as data from other cameras of other nearby vehicles. In various embodiments, the control system 104 provides these and other functions in accordance with the steps of the process 300 discussed further below in connection with the implementation of FIG. 2, the process 300 of FIG. 3, and the illustrations of FIGS. 4-6, in accordance with an exemplary embodiment.

In various embodiments, the control system 104 is disposed within the body 110 of the vehicle 100. In one embodiment, the control system 104 is mounted on the chassis 112. In certain embodiments, the control system 104 and/or one or more components thereof may be disposed outside the body 110, for example on a remote server, in the cloud, or in a remote smart phone or other device where image processing is performed remotely. In addition, in certain embodiments, the control system 104 may be disposed within and/or as part of the cameras 102, navigation system 106, and/or display 108, and/or within and/or or as part of one or more other vehicle systems.

Also, as depicted in FIG. 1, in various embodiments the control system 104 is coupled to the cameras 102 via one or more communications links 109, and receives camera images from the cameras 102 via the communications link 109. In certain embodiments, the communications link 109 comprises one or more wired connections, such as one or more cables (e.g. coaxial cables and/or one or more other types of cables). In other embodiments, the communications link 109 may comprise one or more wireless connections, e.g., using transceiver 122 depicted in FIG. 1.

As depicted in FIG. 1, the control system 104 includes a sensor array 120 and a transceiver 122. Also, as depicted in FIG. 1, in certain embodiments the control system 104 may also include and/or is part of one or more of the cameras 102, the navigation system 106, and/or the display 108, and/or one or more components thereof.

The sensor array 120 generates sensor data, and provides the sensor data to the controller 124 for processing. As depicted in FIG. 1, the sensor array 120 includes one or more detection sensors 126. In various embodiments, the detection sensors 126 include one or more sensors (e.g., radar, lidar, sonar, ultrasonic and so on) that detect objects (e.g., moving vehicles) in proximity to the vehicle. Also in various embodiments, the sensor array 120 may further comprise one or more other sensors 128 (e.g., wheel speed sensors, accelerometers, wheel position sensors, steering angle sensors, turn direction sensors, gear sensors, and so on) that provide data pertaining to vehicle operation. It will also be appreciated that in various embodiments the sensor array 120 may also include the cameras 102, sensors form the navigation system 106, and/or various other types of sensors.

The transceiver 122 transmits messages to, and receives messages from, other vehicles. Specifically, in various embodiments, the transceiver 122 transmits (via instructions provided by the controller 124) camera images, under appropriate circumstances, to other vehicles and/or infrastructure. Also in various embodiments, the transceiver 122 also receives images and other information, under appropriate circumstances, from other vehicles and/or infrastructure. It will be appreciated that in certain embodiments the transceiver 122 may comprise separate transmitters and/or receivers, or the like.

The controller 124 controls operation of the control system 104, and facilitates the control of situation awareness for the vehicle 100, including use of camera images and sharing of camera images and other information between vehicles and/or infrastructure on the roadway, and the generating of static and dynamic situation awareness graphs for the vehicle 100 with respect to detected objects, using the camera images from the cameras of the vehicle 100 along with camera images from cameras of other nearby vehicles and/or infrastructure. In certain embodiments, the controller 124 also controls various functionality of the vehicle 100 (e.g., steering and braking), for example to avoid obstacles, using the camera images and data. In various embodiments, the controller 124 provides these and other functions in accordance with the steps of the process 300 discussed further below in connection with the implementation of FIG. 2 and the illustrations of FIGS. 4-6.

In one embodiment, the controller 124 is coupled to the cameras 102, the navigation system 106, the sensor array 120, the transceiver 122, and the display 108. Also in one embodiment, the controller 124 is disposed within the control system 104, within the vehicle 100. In certain embodiments, the controller 124 (and/or components thereof, such as the processor 132 and/or other components) may be part of and/or disposed within the cameras 102, the navigation system 106, the display 108, and/or one or more other vehicle components. Also in certain embodiments, the controller 124 may be disposed in one or more other locations of the vehicle 100. In addition, in certain embodiments, multiple controllers 124 may be utilized (e.g. one controller 124 within the vehicle 100 and another controller within the cameras 102, the navigation system 106, and/or the display 108), among other possible variations. In addition, in certain embodiments, the controller can be placed outside the vehicle, such as in a remote server, in the cloud or on a remote smart device.

As depicted in FIG. 1, the controller 124 comprises a computer system. In certain embodiments, the controller 124 may also include the cameras 102, the navigation system 106, the display 108, the sensor array 120, the transceiver 122, and/or one or more components thereof. In addition, it will be appreciated that the controller 124 may otherwise differ from the embodiment depicted in FIG. 1. For example, the controller 124 may be coupled to or may otherwise utilize one or more remote computer systems and/or other control systems, for example as part of one or more of the above-identified vehicle 100 devices and systems.

In the depicted embodiment, the computer system of the controller 124 includes a processor 132, a memory 134, an interface 136, a storage device 138, and a bus 140. The processor 132 performs the computation and control functions of the controller 124, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 124 and the computer system of the controller 124, generally in executing the processes described herein, such as the process 300 described further below in connection with FIG. 3, the implementation discussed below in connection with FIG. 2, and the illustrations of FIGS. 4-6.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144.

The bus 140 serves to transmit programs, data, status and other information or signals between the various components of the computer system of the controller 124. The interface 136 allows communication to the computer system of the controller 124, for example from a system driver and/or another computer system, and can be implemented using any suitable method and apparatus. In one embodiment, the interface 136 obtains the various data from the cameras 102, the navigation system 106, the transceiver 122, and/or the sensor array 120. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including direct access storage devices such as hard disk drives, flash systems, floppy disk drives and optical disk drives. In one exemplary embodiment, the storage device 138 comprises a program product from which memory 134 can receive a program 142 that executes one or more embodiments of one or more processes of the present disclosure, such as the steps of the process 300 (and any sub-processes thereof) described further below in connection with FIG. 3. In another exemplary embodiment, the program product may be directly stored in and/or otherwise accessed by the memory 134 and/or a disk (e.g., disk 146), such as that referenced below.

The bus 140 can be any suitable physical or logical means of connecting computer systems and components. This includes, but is not limited to, direct hard-wired connections, fiber optics, infrared and wireless bus technologies. During operation, the program 142 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 124 may also otherwise differ from the embodiment depicted in FIG. 1, for example in that the computer system of the controller 124 may be coupled to or may otherwise utilize one or more remote computer systems and/or other control systems.

Figure 2:
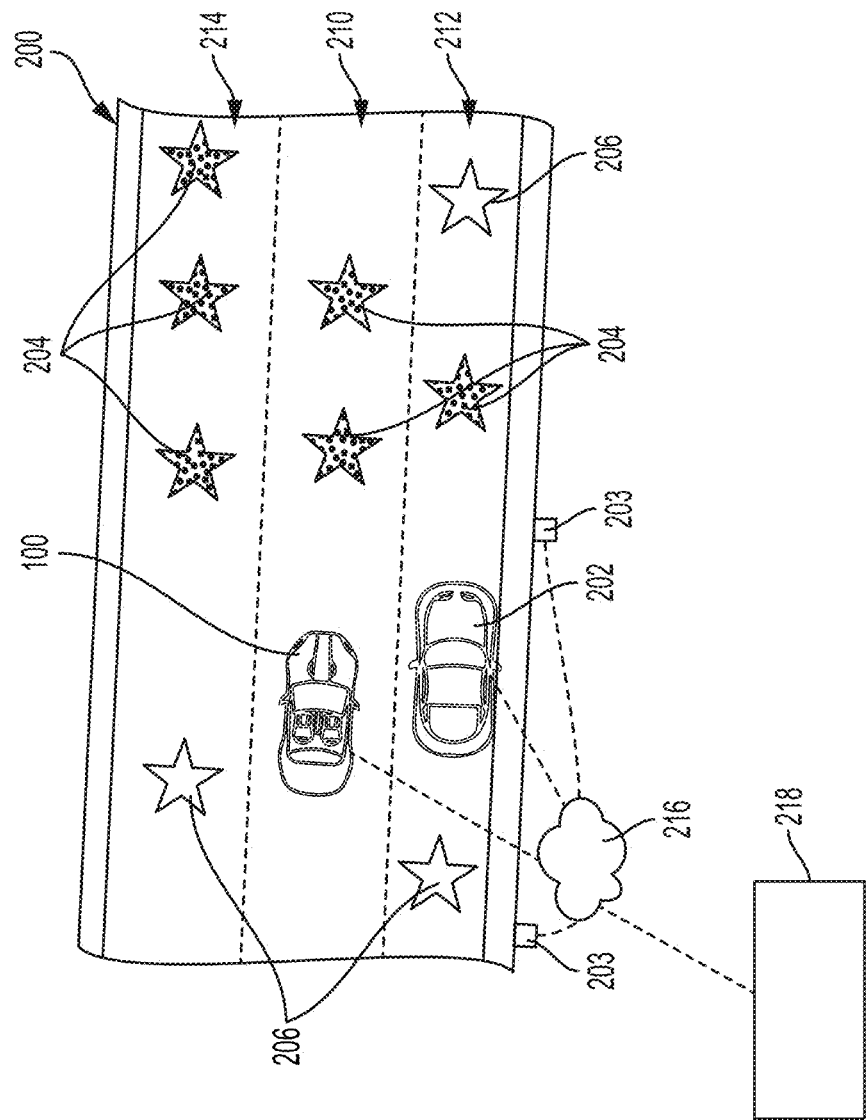
FIG. 2 is a schematic illustration showing an intersection of a roadway in which the vehicle is driving alongside another vehicle and in proximity to various objects and infrastructure, in accordance with an exemplary embodiment.

FIG. 2 is a functional block diagram for an illustration in accordance with an implementation of the present disclosure showing a roadway 200. As depicted in FIG. 2, the roadway 200 includes the vehicle 100 of FIG. 1 along with a second vehicle 202. In addition, exemplary vehicle infrastructure 203 (which may include, by way of example, stop lights, stop lights, road signs, walls, curbs, and the like of the roadway 200, which may include cameras, sensors, and/or transceivers within the infrastructure 203 and/or mounted thereon, and so on) are also depicted in FIG. 2. Also, as depicted in FIG. 2, a number of objects are depicted along the roadway 200, including visible objects 204 and invisible objects 206 (e.g., with respect to one or both of the vehicles 100, 202). Also, as shown in FIG. 2, in certain embodiments, the roadway 200 includes various lanes 210, 212, 214. As illustrated in FIG. 2, the vehicle 100 of FIG. 1 is travelling in a first lane 210 (e.g., a middle lane), while the second vehicle 202 is travelling in a second lane 212 (e.g., a right lane), and the various objects 204, 206 may be disposed in each of the first, second, or third lanes 210, 212, 214. It will be appreciated that the number and nature of the lanes, and the number and placement of the vehicles 100, 202 and objects 204, 206, may vary in different embodiments.

As will be explained in greater detail in connection with the process 300 discussed further below in connection with FIG. 3, in various embodiments the control system 104 of the vehicle 100 communicates with the second vehicle 202 of FIG. 2, and vice versa, in a manner that facilitates both vehicles 100, 202 to ascertain improved situation awareness for the respective vehicles 100, 202. Also in various embodiments, the second vehicle 202 includes components (such as a camera, a display, navigation system, and a control system) that are similar or identification to the respective components of the vehicle 100 of FIG. 1.

As depicted in FIG. 2, the vehicles 100, 202 (and, in certain embodiments, the infrastructure 203) communicate via one or more wireless networks 216. In various embodiments, the wireless networks 216 may comprise any one or more of a number of different types of networks and/or communication links, such as Wi-Fi, cellular, satellite, and/or other communication networks and/or links. Also in certain embodiments, the vehicles 100, 202 and infrastructure 203 communicate, via the wireless networks 216, with a remote server 218. In various embodiments, the remote server 218 includes structural features and performs functions similar to the control system 104 of FIG. 1, for example including the use of a transceiver to transmit and receive data, a memory 134 to store data, a processor 132 to make determinations and provide control for situation awareness and/or other vehicle control for the vehicles 100, 202 and infrastructure 203, and so on.

Figure 3A:
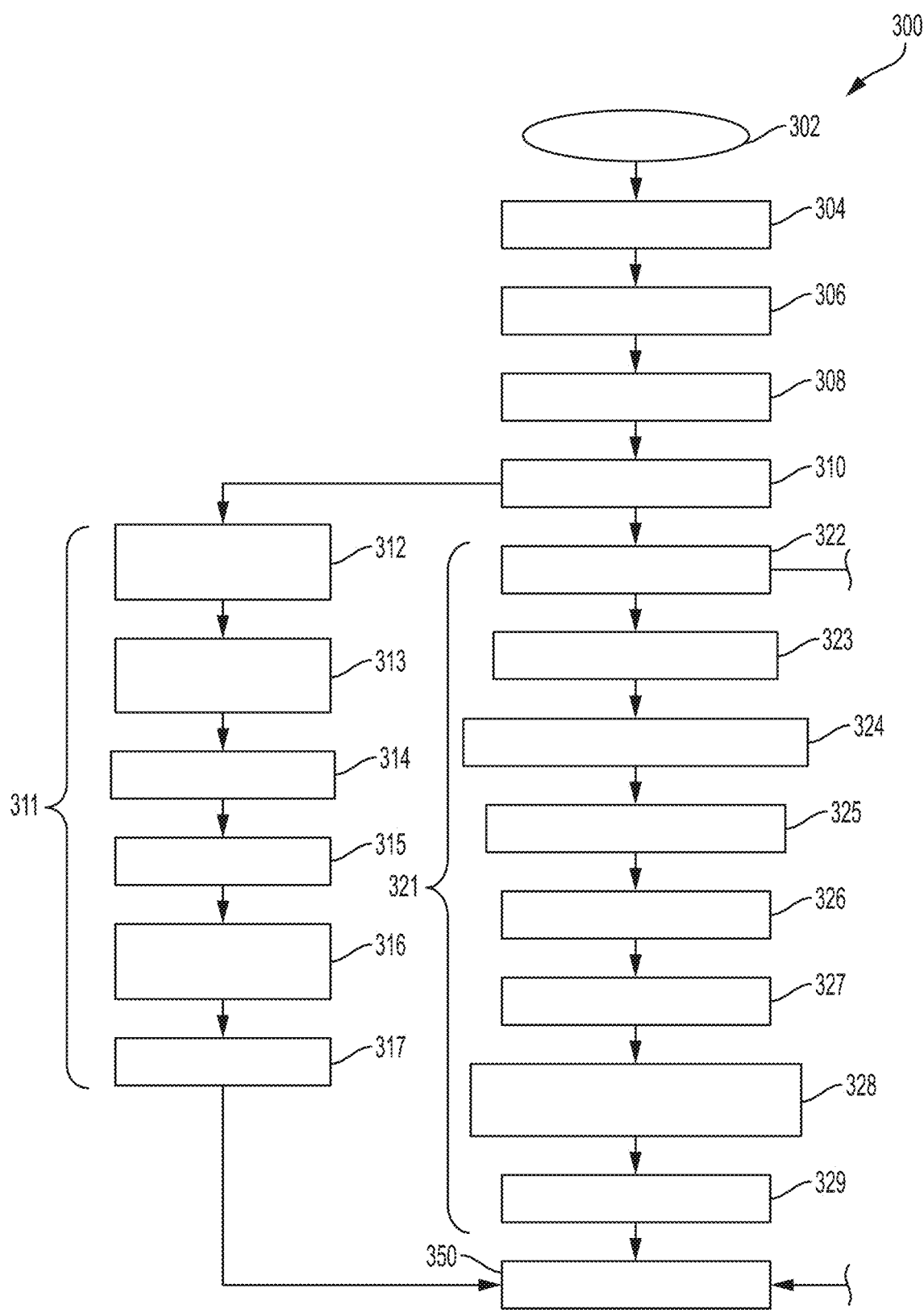
FIG. 3 is a flowchart of a process for providing situation awareness for a vehicle using one or more cameras of the vehicle and one or more other cameras that are remote from the vehicle, and that can be implemented in connection with the vehicle, cameras, and control system and display of FIG. 1, and the illustration of FIG. 2, in accordance with an exemplary embodiment (Applicant notes that the flowchart of FIG. 3 covers two pages, numbered FIG. 3A and FIG. 3B, which both pages FIG. 3A and FIG. 3B collectively comprising a single flowchart that is referred to herein as FIG. 3)
Figure 3B:
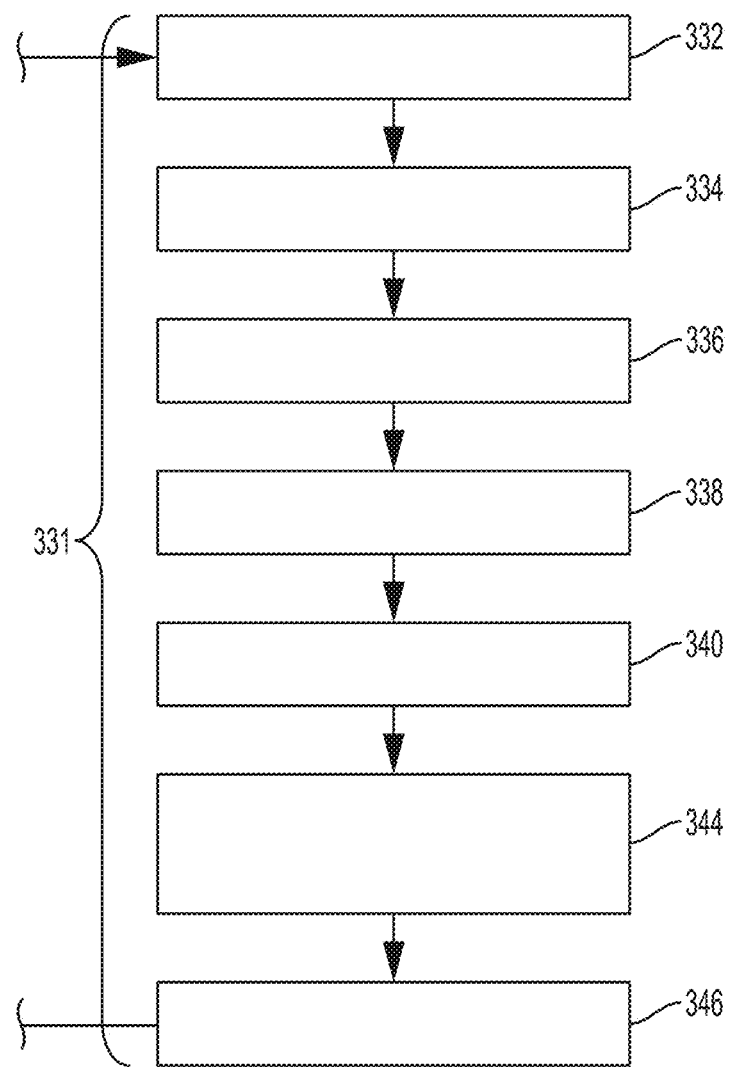

FIG. 3 is a flowchart of a process 300 for controlling a situation awareness for a vehicle, in accordance with an exemplary embodiment. The process 300 can be implemented in connection with the vehicle 100, cameras 102, navigation system 106, display 108, and control system 104 of FIG. 1, along with the vehicle 202, and infrastructure 203, wireless networks 216, and remote server 218 of FIG. 2, in accordance with an exemplary embodiment.

As depicted in FIG. 3, the process begins at 302. In one embodiment, the process 300 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In one embodiment, the steps of the process 300 are performed continuously during operation of the vehicle. It will also be appreciated that, in various embodiments, the steps of the process 300 may be performed by multiple vehicles at the same time, such as the vehicle 100 and the second vehicle 202 and/or and infrastructure 203 of FIGS. 1 and 2.

Camera data is obtained for the vehicles (step 304). In various embodiments, camera images are obtained from one or more of the cameras 102 of the vehicle 100 of FIG. 1. In certain embodiments, the camera images also include still images and/or video camera images from one or more points of view for the vehicle 100. In various embodiments, the camera data is provided to the processor 132 of FIG. 1. Also in various embodiments, camera data (e.g., including camera images) is similarly obtained for one or more additional vehicles, such as the second vehicle 202 of FIG. 2 (e.g., from cameras of the second vehicle 202) and/or from the and infrastructure 203 (e.g., from cameras thereof).

Other sensor data is obtained (step 306). In various embodiments, sensor data is obtained from one or more other sensors 128 of the vehicle 100 of FIG. 1 (e.g., wheel speed sensors, accelerometers, wheel position sensors, steering angle sensors, turn direction sensors, gear sensors, and so on) with information pertaining to operation of the vehicle 100. In various embodiments, the other sensor data is obtained via the sensor array 120 of FIG. 1 and provided to the processor 132 of FIG. 1. Also in various embodiments, similar types of other sensor data are similarly obtained for one or more additional vehicles and/or infrastructure, such as the second vehicle 202 of FIG. 2 (e.g., from sensors of the second vehicle 202) and/or and infrastructure 203 (e.g., from sensors thereof).

The camera data is transmitted (step 308). In various embodiments, the different vehicles 100, 202 prepare camera feeds (e.g., still and/or video images, and/or associated information) for transmission to one another, and/or to other vehicles and/or infrastructure, and/or to the remote server 218, via the wireless networks 216. In various embodiments, the other sensor data is also transmitted as part of step 308. Also in various embodiments, the data is transmitted via the transceiver 122 of FIG. 1 and/or a similar transceiver of the second vehicle 202 and/or infrastructure 203. In certain embodiments, the data is shared between the vehicles 100, 202 and/or infrastructure 203 using one or more transceivers and/or communication networks, for example such as a vehicle to vehicle and/or infrastructure mesh network (e.g., including DSRC, LTE, WiFi, and/or other communications), a peer to peer network, and/or one or more other communication networks.

In various embodiments, the camera data is aggregated (step 310). In certain embodiments, each vehicle aggregates camera data from itself and from other nearby vehicles (e.g., via the processor 132 of the vehicle 100 of FIG. 1, and/or from a non-depicted processor of the second vehicle 202 of FIG. 2) and/or infrastructure 203 (e.g., from a non-depicted processor thereof). In certain embodiments, the aggregation may be performed, in whole or in part, by the remote server 218 of FIG. 2. In certain embodiments, various pre and/or post processing steps may be performed, such as applying image cropping and distortion correction. For example, in certain embodiments, during these aggregation step(s), the consensus of current global static graph is generated by the information provided by a number of vehicles and/or infrastructure, weighted by their respective confidence based on their camera sensors' quality.

In certain embodiments, a global static graph is generated and utilized during a first sub-sequence 311 of steps, as described below. In various embodiments, the global static graph comprises a graphical representation for situation awareness for the vehicle(s) based on the camera data from the vehicles 100, 202 and/or infrastructure 203 at a particular point in time, as set forth below in accordance with sub-sequence 311 (corresponding to steps 312-317, described below).

First, during step 312, individual vehicle static graphs are generated for the various vehicles (e.g., the vehicles 100, 202) and/or infrastructure (e.g., infrastructure 203). Specifically, with reference to FIG. 4, in various embodiments, a first vehicle static graph 400 of the vehicle 100 (having a first viewpoint 402 of the first vehicle 100), and one or more additional static graphs 410 (e.g., of the second vehicle 202 and/or infrastructure 203) (each having a respective second or additional viewpoint 412 of the second vehicle 202 and/or infrastructure), are generated. In various embodiments, the vehicles 100, 202 and/or infrastructure 203 share their respective individual probability distributions (or, static graphs) 400, 410 (with their respective viewpoints 402, 412) with one another, with other vehicles and/or infrastructure, and/or with the remote server 218 via transmissions that are sent by respective transceivers (e.g., transceiver 122 of FIG. 1) along the wireless networks 216.

Next during step 313, in various embodiments, principal components analysis is performed with respect to Mahalanobis Distances from the individual static graphs of step 312 (e.g., the first vehicle static graph 400 of the first vehicle 100 and the second vehicle static graphs 410 of the second vehicle 202 and/or infrastructure 203). For example, in one exemplary embodiments the Mahalanobis Distance is calculated with respect to identified objects of corresponding vectors for each of the individual static graphs, in accordance with the following equation:

$$MahalD(VB, WB') = \sqrt{\left(\vec{V_B} - \vec{W_B}\right)^T S^{-1} \left(\vec{V_B} - \vec{W_B}\right)},$$ (Equation 1)

in which "MahalD" represents the Mahalanobis Distance, "VB" represents the first vehicle 100, "WB" represents the second vehicle (or infrastructure), and "S" represents the covariance of these two vectors VB and WB. Also in various embodiments, respective different individual vehicle static graphs are determined to refer to the same detected object if the Mahalanobis Distance is less than a predetermined threshold distance. In certain embodiments, the predetermined threshold distance is a post-calibrated parameter that is generated by experts (e.g., from manufacturer of the vehicle 100). In various embodiments, one or more different calculations may be utilized, for example using one or more different equations. In various embodiments, these actions are performed by one or more processors (e.g., via the processor 132 of the vehicle 100 of FIG. 1, and/or from a non-depicted processor of the second vehicle 202 of FIG. 2, infrastructure 203, and/or of the remote server 218 of FIG. 2).

Weights are determined for the different individual static graphs (step 314). In certain embodiments, the weights comprise a weighted average of the static graphs (e.g., a weighted average of each of the respective points and distances from the first vehicle static graph 400 and the second static graph(s) 410 of FIG. 4). Also in certain embodiments, one or more different techniques may be utilized for the weighting, such as a historical trust weight for the respective individual vehicle static graphs, one or more clustering algorithms, or the like. In various embodiments, these actions are performed by one or more processors (e.g., via the processor 132 of the vehicle 100 of FIG. 1, and/or from a non-depicted processor of the second vehicle 202 and/or infrastructure 203 of FIG. 2 and/or of the remote server 218 of FIG. 2).

In various embodiments, the different individual static graphs are merged together in accordance with their respective weights (step 315). As a result, the global static graph is generated (step 316). Specifically, the global static graph represents a combined view of the surroundings of the vehicles 100, 202 and/or infrastructure 203 (including the objects 204, 206 in proximity thereto), leveraging the camera data from both of the vehicles 100, 202 and/or infrastructure 203 combined together. In various embodiments, these actions are performed by one or more processors (e.g., via the processor 132 of the vehicle 100 of FIG. 1, and/or from a non-depicted processor of the second vehicle 202 and/or infrastructure 203 of FIG. 2 and/or of the remote server 218 of FIG. 2).

Figure 4:
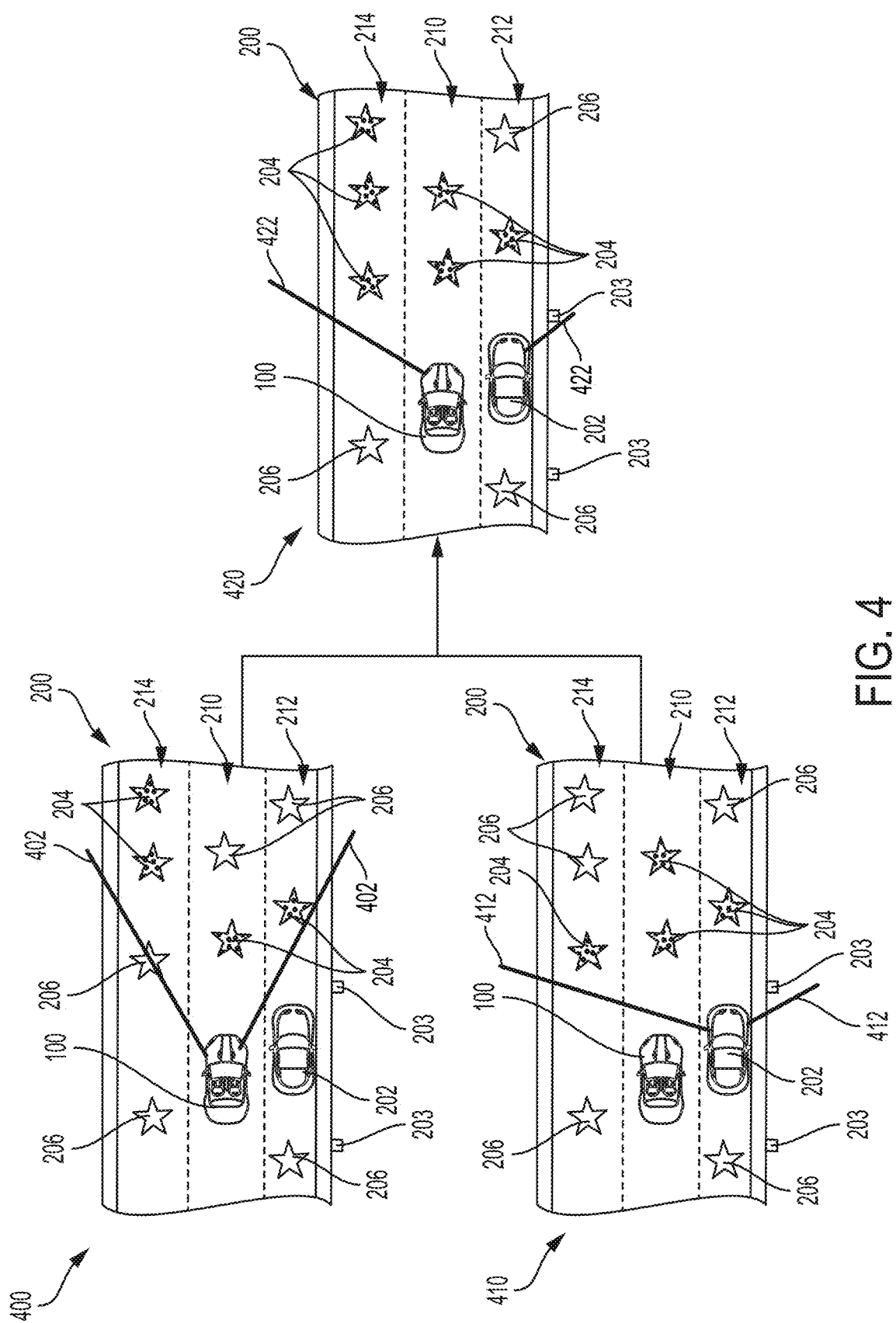
FIG. 4 provides an illustration of one sequence of steps of the process of FIG. 3; specifically, pertaining to the generation of a static topology graph using the camera data.

Specifically, with reference to FIG. 4, in various embodiments, a global static graph 420 is generated that comprises a global viewpoint 422, utilizing the first vehicle static graph 400 of the vehicle 100 (having a first viewpoint 402 of the first vehicle 100) and the second vehicle static graph 410(s) of the second vehicle 202 and/or infrastructure 203 (having one or more second or additional viewpoints 412 of the second vehicle 202 and/or infrastructure 203). As noted above, in various embodiments, the vehicles 100, 202 and/or infrastructure 203 share their respective static graphs 400, 410 (with their respective viewpoints 402, 412) with one another, with other vehicles and/or infrastructure, and/or with the remote server 218 via transmissions that are sent by respective transmitters along the wireless networks 216. Accordingly, in various embodiments, the global static graph 420 may be generated via vehicle to vehicle communication, vehicle to infrastructure communication, and/or indirect driver to driver communication via the wireless networks 216 (e.g., via the cloud), and/or via the remote server 218, among other possible variations. Also in various embodiments, various participating vehicles and/or infrastructure in proximity to one another may share their own instantaneous static graph/viewpoint with its neighbor vehicles and infrastructure, and so on.

In various embodiments, the global static graph 420 (and associated viewpoint 422) includes a broader and/or more comprehensive view of nearby objects, from incorporating the respective static graphs 400, 410 (and respective associated viewpoints 402, 412) from the different cameras of the respective vehicles 100, 202 and/or infrastructure 203. For example, as depicted in FIG. 4, in various embodiments, the number of visible objects 204 increases, while the number of invisible objects 206 correspondingly decreases, to thereby provide for improved object detection and avoidance for the vehicles 100, 202.

Also in various embodiments, the global static graph 420 includes the list of observed objects (e.g., objects 204, 206, which may include other vehicles and/or other objects), along with six degrees of freedom for the vehicle 100 generating the static graph. Also in various embodiments, the six degrees of freedom pose estimates of the observed objects, including a distance and an angle to the observed objects.

Once the global static graph is generated, the situation awareness of the vehicles is updated in accordance with the global static graph (step 316). In various embodiments, estimated parameters for the detected objects 204, 206 (e.g., estimated locations, distances, and angles from the respective vehicles 100, 202) are updated using the global static graph 420. In various embodiments, these actions are performed by one or more processors (e.g., via the processor 132 of the vehicle 100 of FIG. 1, and/or from a non-depicted processor of the second vehicle 202 and/or infrastructure 203 of FIG. 2 and/or of the remote server 218 of FIG. 2). In various embodiments, the process then proceeds to step 350 (discussed further below), in which the vehicle 100 is controlled at least in part based on the global static graph and the estimates regarding the detected objects.

With reference back to step 310, also in various embodiments, a dynamic time-evolving situation awareness graph is generated and utilized during a second sub-sequence 321 of steps, as described below. In various embodiments, the dynamic time-evolving situation awareness graph comprises a graphical representation for situation awareness for the vehicle(s) and/or infrastructure over time based on the camera data from the vehicles 100, 202 and/or infrastructure 203 at different points in time, as set forth below in accordance with sub-sequence 321 (corresponding to steps 322-329, described below).

First, during step 322, a global static situational awareness graph is generated. In various embodiments, the global static situational awareness graph is generated by one or more processors (e.g., via the processor 132 of the vehicle 100 of FIG. 1, and/or from a non-depicted processor of the second vehicle 202 and/or infrastructure 203 of FIG. 2 and/or of the remote server 218 of FIG. 2) by merging individual vehicle static graphs (e.g., for the vehicle 100 and the second vehicle 202, and/or the vehicle 100 and the infrastructure 203, and so on), for example using the techniques in steps 312-316 described above. Also in various embodiments, different global static situational graphs are generated in this manner at different points in time, for example as the vehicles 100, 202 are traveling along the roadway 200 of FIG. 2, based on merging of different respective individual vehicle static graphs for the vehicles 100, 202 and/or the infrastructure 203 (e.g., as generated at step 312, described above) at the different points in time.

In addition, in various embodiments, a correlation function is generated for the first vehicle (step 323). In various embodiments, the correlation function pertains to a comparison of the values of the individual vehicle graphs for the vehicle 100 at different points in time in comparison with respective values of the global graphs at the points in time (e.g., as a measure of accuracy and/or precision of the values for the cameras 102 of the first vehicle 100). Also in various embodiments, the correlation function for the first vehicle 100 includes a weight factor that includes a factor comparing a position (e.g., a position of a detected object) in frame 1 (e.g., at a first time $t_0$) to position in frame 2 (e.g., at a second time $t_1$), and a factor comparing visual words) defining a connection from a detected object (e.g., $object_1$) in one frame to the same detected object (e.g., $object_1$) in next frame based on data from first vehicle 100, and so on. In various embodiments, similar connections are utilized for subsequent frames (e.g., from time $t_1$ to subsequent time $t_2$, and so on). In various embodiments, these actions are taken by one or more processors (e.g., via the processor 132 of the vehicle 100 of FIG. 1, and/or from a non-depicted processor of the second vehicle 202 of FIG. 2 and/or of the remote server 218 of FIG. 2).

Also in various embodiments, similar correlation functions are generated for other nearby vehicles and/or infrastructure based on their respective cameras (step 324). For example, with respect to the second vehicle 202, in various embodiments, the correlation function pertains to a comparison of the values of the individual vehicle graphs for the second vehicle 202 at different points in time in comparison with respective values of the global graphs at the points in time (e.g., as a measure of accuracy and/or precision of the values for the cameras of the second vehicle 202). Also in various embodiments, the correlation function for the second vehicle 202 includes a weight factor that includes a factor comparing a position (e.g., a position of a detected object) in frame 1 (e.g., at a first time $t_0$) to a position in frame 2 (e.g., at a second time $t_1$), and a factor comparing visual words) defining a connection from a detected object (e.g., $object_1$) in one frame to the same detected object (e.g., $object_1$) in next frame based on data from second vehicle 202, and so on. In various embodiments, similar connections are utilized for subsequent frames (e.g., from time $t_1$ to subsequent time $t_2$, and so on). In various embodiments, these actions are taken by one or more processors (e.g., via the processor 132 of the vehicle 100 of FIG. 1, and/or from a non-depicted processor of the second vehicle 202 of FIG. 2 and/or of the remote server 218 of FIG. 2). Similarly, in certain embodiments, correlation functions may likewise be generated, with corresponding weight factors, for the infrastructure 203 (e.g., via the processor 132 of the vehicle 100 of FIG. 1, and/or from a non-depicted processor of the infrastructure 203 of FIG. 2 and/or of the remote server 218 of FIG. 2).

A cost function is determined (step 325). In various embodiments, the results of the various correlations of steps 323-324 of the various vehicles (e.g., including the vehicle 100 and the second vehicle 202) are summed together to determine a cost function defining a connection from $object_1$ (i.e., a first detected object) in frame 1 (e.g., at time $t_0$) to $object_1$ in frame 2 (e.g., at time $t_1$). In addition, in various embodiments, similar cost functions are determined for each of the detected objects (e.g., for each of the objects, such as $object_2$, $object_3$, and so on detected by the first vehicle 100 and/or the second vehicle 202) from frame 1 (e.g., at time $t_0$) to frame 2 (e.g., at time $t_1$). Also in various embodiments, for each of the objects (e.g., $object_1$, $object_2$, $object_3$, and so on), cost functions are similarly determined with respect to each vehicle (for each object) and/or with respect to each infrastructure between subsequent frames as well, such as between frame 2 (e.g., at time $t_1$) and frame 3 (e.g., at time $t_2$), and so on. Also in various embodiments, the determination of the cost function is made by one or more processors (e.g., via the processor 132 of the vehicle 100 of FIG. 1, and/or from a non-depicted processor of the second vehicle 202 and/or infrastructure 203 of FIG. 2 and/or of the remote server 218 of FIG. 2).

Also in various embodiments, a highest cost object is determined (step 326). In certain embodiments, the highest cost object is determined for each object (e.g., object$_1$) for each frame sequence (e.g., between frame 1 and frame 2, and so on), based on an evaluation of the cost functions of step 325 in determining the highest cost object to object connection corresponding to matched objects from frame to frame. Also in various embodiments, these actions are made by one or more processors (e.g., via the processor 132 of the vehicle 100 of FIG. 1, and/or from a non-depicted processor of the second vehicle 202 and/or infrastructure 203 of FIG. 2 and/or of the remote server 218 of FIG. 2).

Weights are determined for the various vehicles and/or infrastructure (step 327). In various embodiments, weights are determined for each of the vehicles and, if applicable, infrastructure (e.g., the first vehicle 100, the second vehicle 202, and the infrastructure 203) as a measure of accuracy and/or precision for the values generated from the camera images for object detection by the first vehicle 100, the second vehicle 202, and the infrastructure 203 (and for any other participating vehicles and infrastructure). In various embodiments, the weight for the first vehicle 100 is determined by comparing the first vehicle 100's position for each detected object (e.g., as estimated using the images from the cameras 102 of the first vehicle 100) versus that represented in the global graph of step 322. Similarly, in various embodiments, the weight for the second vehicle 202 is determined by comparing the second vehicle 202's position for each detected object (e.g., as estimated using the images from the cameras of the second vehicle 202) versus that represented in the global graph of step 322 (in various embodiments, the weight for the infrastructure 203 would be similarly determined based on the images from the cameras of the infrastructure 203, and so on). Also in certain embodiments, the weights are determined also in part based on the correlation functions of steps 323-324, the cost functions of step 325, and the highest cost object of step 326. In certain embodiments, these actions are made by one or more processors (e.g., via the processor 132 of the vehicle 100 of FIG. 1, and/or from a non-depicted processor of the second vehicle 202 and/or the infrastructure 203 of FIG. 2 and/or of the remote server 218 of FIG. 2) utilizing a collaborative camera principle, a prediction of position via an extended Kalman filter, and a correlation of visual words, in accordance with the following equation (Equation 2):

$$Cost_{A,A'} = w_{red} f_{cor}^{6DoF}\left(\begin{bmatrix} x \\ y \\ z \end{bmatrix} \begin{bmatrix} \alpha \\ \beta \\ \gamma \end{bmatrix}\right)_{A'}, KF\left(\begin{bmatrix} x \\ y \\ z \end{bmatrix} \begin{bmatrix} \alpha \\ \beta \\ \gamma \end{bmatrix}\right)_{A}, V_A, \theta_A\right) g_{cor}^{BoVW}(A, A') +$$

$$w_{BLK} f_{cor}^{6DoF}\left(\begin{bmatrix} x \\ y \\ z \end{bmatrix} \begin{bmatrix} \alpha \\ \beta \\ \gamma \end{bmatrix}\right)_{A'}, KF\left(\begin{bmatrix} x \\ y \\ z \end{bmatrix} \begin{bmatrix} \alpha \\ \beta \\ \gamma \end{bmatrix}\right)_{A}, V_A, \theta_A\right) g_{cor}^{BoVW}(A, A')$$

in which "W" represents the respective calculated weights, "V" represents the respective velocities, "θ" represents the respective angles with respect to detected objects, "fcor" and "gcor" represent respective correlations, and "KF" represents the extended Kalman Filter. In other embodiments, one or more different equations may be utilized.

A dynamic time-evolving situational awareness graph is generated (step 328). In various embodiments, the dynamic time-evolving situational awareness graph comprises a global dynamic time-evolving bipartite situational awareness graph over the various points of time, by updating the global graph of step 322 with the updated data from the different vehicles 100, 202 (and in certain embodiments, the infrastructure 203), merged together with the weights of step 327 in accordance with the analysis of steps 323-327. In various embodiments, these actions are performed by one or more processors (e.g., via the processor 132 of the vehicle 100 of FIG. 1). In various embodiments, the dynamic time-evolving situational awareness graph provides for updating and refining the global static graph by accounting for changes over time as well as for updating the weights based on the relative accuracy and/or precisions from the distributions from the various vehicles 100, 202 (and in certain embodiments, the infrastructure). For example, in various embodiments, updated weights for the respective vehicles 100, 202 are continuously generated based on comparing the respective vehicles' updated positions for each detected object (e.g., as estimated using updated images from the cameras of the respective vehicles) versus that represented in updated versions of the dynamic time-evolving situational awareness graph of step 328, and so on. In certain embodiments, the weights for the infrastructure 203 are similarly continuously generated, and so on. Also in various embodiments, the dynamic time-evolving situational awareness graph of step 328 could be utilized to predict the trajectory of detected objects, using the first situation awareness graph and the second situation awareness graph over multiple periods of time, using respective first and second weights for the first and second situation the first camera images.

Figure 5:
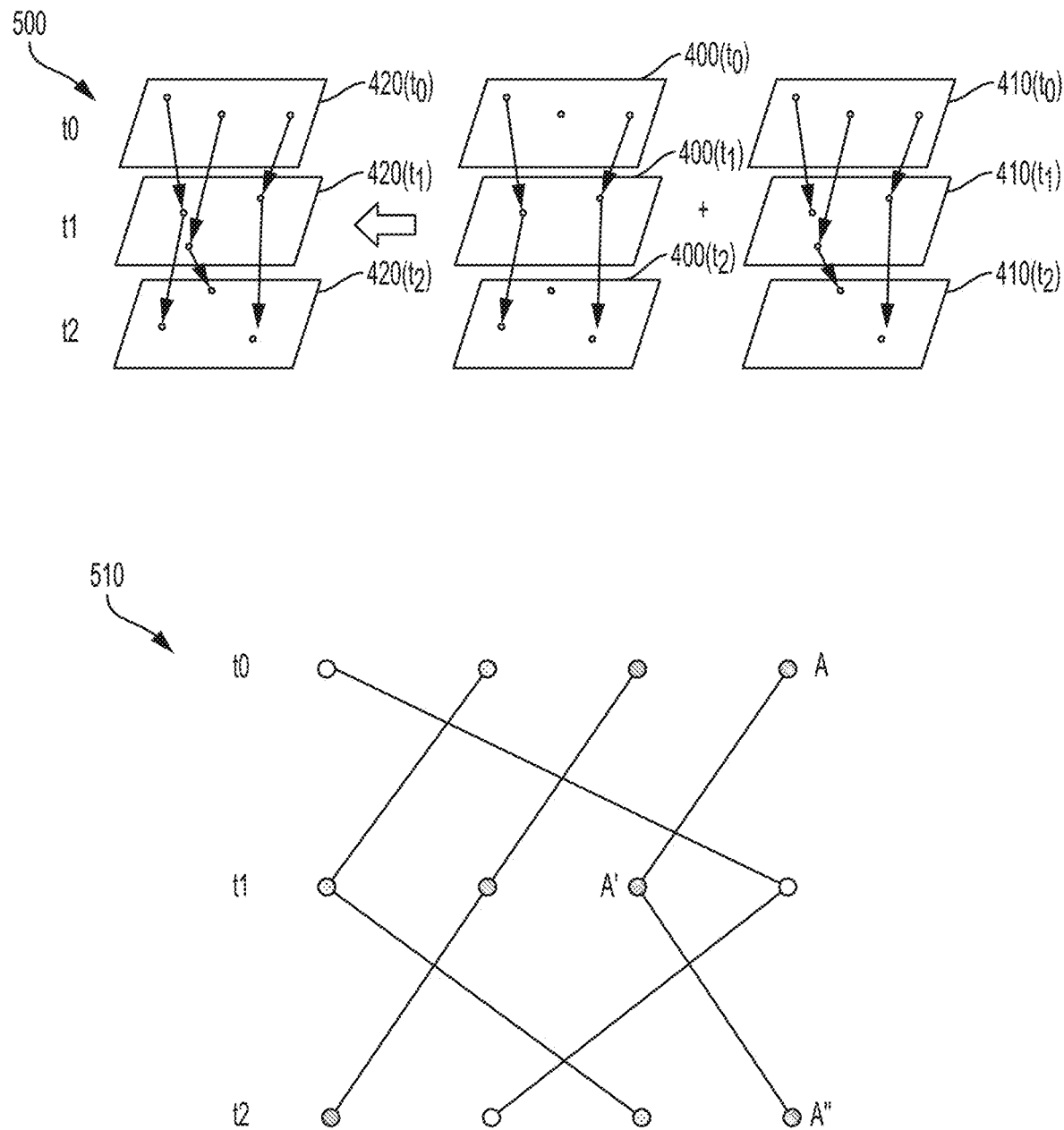
FIG. 5 provides an illustration of another sequence of steps of the process of FIG. 3; specifically, pertaining to the generation of a dynamic bipartite graph over time using the camera data.

With reference to FIG. 5, in accordance with various embodiments, the evolving bipartite graph is demonstrated with first and second illustrations 500 and 510. First, with reference to the first illustration 500, the individual vehicle probability distributions for the first vehicle 100 at different points in time $t_0$, $t_1$, and $t_2$ are depicted and denoted with reference numbers 400 ($t_o$), 400 ($t_1$), and 400 ($t_2$), respectively. Also in the first illustration 500, the individual vehicle probability distributions for the second vehicle 202 at different points in time $t_0$, $t_1$, and $t_2$ are depicted and denoted with reference numbers 410 ($t_o$), 410 ($t_1$), and 410 ($t_2$), respectively. In addition, in the first illustration 500, the global vehicle probability distributions (formed by merging the respective individual probability distributions (or, static graphs) 400, 410, at the respective points in time with the respective weights) at different points in time $t_0$, $t_1$, and $t_2$ are depicted and denoted with reference numbers 420 ($t_o$), 420 ($t_1$), and 420 ($t_2$), respectively. Next, the second illustration 510 represents a dynamic bipartite graph that is generated using the global vehicle probability distributions.

Once the dynamic time-evolving bipartite graph is generated, the situation awareness of the vehicles is updated in accordance with the dynamic time-evolving situation awareness graph (step 329). In various embodiments, estimated parameters for the detected objects 204, 206 (e.g., estimated locations, distances, and angles from the respective vehicles 100, 202 and/or infrastructure 203) are updated using the dynamic time-evolving bipartite graph of step 328. Also in various embodiments, a trajectory of the detected objects is predicted using the dynamic time-evolving bipartite graph of step 328. In various embodiments, the process then proceeds to step 350 (discussed directly below), in which the vehicle 100 is controlled at least in part based on the dynamic time-evolving graph of step.

With reference back to step 310, also in various embodiments, a dynamic time-evolving probabilistic situation awareness graph is generated and utilized during a third sub-sequence 331 of steps, as described below. In various embodiments, the dynamic time-evolving particle filter graph comprises a graphical representation for situation awareness for the vehicle(s) over time based on the camera data from the vehicles 100, 202 (and, in certain embodiments, from the infrastructure 203) at different points in time, as set forth below in accordance with sub-sequence 331 (corresponding to steps 332-346, described below).

First, during step 332, the first vehicle 100 maintains its own prior probability distribution (e.g., $x_{t-1}$) the location of one or more detected objects, and also generates a new distribution based on the first vehicle 100's observation of the detected object (e.g., $u_t$) in order to obtain the first vehicle 100's new probability distribution (e.g., $x_t$) for the location of the detected object. In various embodiments, these actions are performed by one or more processors (e.g., via the processor 132 of the vehicle 100 of FIG. 1).

Also in various embodiments, during step 334, additional vehicles (e.g., the second vehicle 202 of FIG. 2) and/or infrastructure (e.g., the infrastructure 203 of FIG. 2) also maintain their own prior probability distribution (e.g., $x_{t-1}$) the location of one or more detected objects, and also generates a new distribution based on the additional vehicle's (e.g., the second vehicle's) and/or infrastructure's observation of the detected object (e.g., $u_t$) in order to obtain the additional vehicle's (e.g., the second vehicle 202's) new probability distribution (e.g., $x_t$) for the location of the detected object. In various embodiments, these actions are performed by one or more processors (e.g., via a processor of the second vehicle 202 and/or the infrastructure 203 of FIG. 2).

The probability distributions for the various vehicles are reported (step 336). Specifically, in certain embodiments, the probability distributions from the first vehicle 100 and the second vehicle 202 and/or the infrastructure 203 are transmitted from the respective vehicles via respective transmitters via the wireless networks 216 of FIG. 2 between the vehicles 100, 202 and/or the infrastructure 203, and in certain embodiments to other nearby vehicles and/or to the remote server 218 of FIG. 2 (e.g., similar to the discussion above with respect to the data transmissions of step 308).

Also in various embodiments, a global probability distribution is generated (step 338). In certain embodiments, a weight-dependent number of samples are drawn from the respective updated probability distributions from the different vehicles and/or infrastructure, and the global probability distribution is generated by merging the probability distributions of the individual vehicles and/or infrastructure based on the respective weights. In certain embodiments, a weight-dependent number of samples from the first vehicle 100 and the second vehicle 202 and/or the infrastructure 203 are taken by one or more processors (e.g., via the processor 132 of the vehicle 100 of FIG. 1, and/or from a non-depicted processor of the second vehicle 202 and/or the infrastructure 203 of FIG. 2 and/or of the remote server 218 of FIG. 2), and the weights are used in merging the respective probability distributions in generating the global probability distribution. In certain embodiments, the weights utilized may be dependent on previously used weights for the respective vehicles 100, 202, and/or from prior history of accuracy and/or reliability of the probabilities for the respective vehicles 100, 202 and/or the infrastructure 203, or the like. In certain embodiments, the global distribution is generated in accordance with the following equation:

$$\text{Posterior Probability} = \frac{\sum v_i \omega_i}{\sum \omega_i}, \quad \text{(Equation 3)}$$

in which $v_i$ represents each reporting car's estimated location of targeted car and $\omega_i$ is the weight of that reporting car's prediction (accordingly, the above equation represents the weighted average of the predicted vehicle location, in certain embodiments).

Also in various embodiments, weights of the various vehicles and/or infrastructure are updated (step 340). In certain embodiments, the weight of the first vehicle 100 is updated based on a comparison of the first vehicle 100's probability distribution (i.e., of step 332) and the merged probability distribution (i.e., of step 334). In various embodiments, these actions are performed by one or more processors (e.g., via the processor 132 of the vehicle 100 of FIG. 1 and/or from a non-depicted processor of the remote server 218 of FIG. 2). Also in various embodiments, a weight of each the additional vehicle(s) and/or infrastructure is updated as part of step 340. In certain embodiments, the weight of the second vehicle 202 is updated based on a comparison of the second vehicle 202's probability distribution (i.e., of step 334) and the merged probability distribution (i.e., of step 334). Also in certain embodiments, the weight of the infrastructure 203 is similarly updated based on a comparison of the infrastructure 203's probability distribution and the merged probability distribution, and so on. In various embodiments, these actions are performed by one or more processors (e.g., via from a non-depicted processor of the second vehicle 202, the infrastructure 203, and/or the remote server 218 of FIG. 2).

In various embodiments, the dynamic time-evolving particle filter graph is generated (step 344). For example, in various embodiments, one or more processors (e.g., via the processor 132 of the vehicle 100 of FIG. 1, and/or from a non-depicted processor of the second vehicle 202 and/or the infrastructure 203 of FIG. 2 and/or of the remote server 218 of FIG. 2) generate the dynamic time-evolving particle filter graph using the merged probability distribution of step 338. Also in various embodiments, such processor(s) continually update the dynamic time-evolving particle filter graph based on repeating steps 332-344 in new iterations (e.g., at subsequent points in time), for example utilizing new updated probability distributions for the respective vehicles 100, 202 and/or the infrastructure 203 in steps 332-336, and generating revised global probability distributions in new iterations of step 338 (e.g., also at subsequent points in time), utilizing the updated weighted for the vehicles 100, 202 and/or the infrastructure 203 of step 340, and so on. Also in various embodiments, the dynamic time-evolving particle filter graph of step 344 is utilized to predict the trajectory of detected objects, using the first situation awareness graph and the second situation awareness graph over multiple periods of time, using respective first and second weights for the first and second situation the first camera images.

In certain embodiments, the revised global probability distributions are generated based on resampling of data and corresponding recalculation of the results using an iterative process from collaborative cameras.

For example, in certain embodiments, the resampling is performed in accordance with the following equation (Equation 4):

$$Q(t)p(x_t|x_{t-1}, u_t)$$

in which Q(t) represents re-sampling at time (t), and "p" represents the conditional probability at point in time (t) given previous probability at time (t−1) and the new observations $u_t$ from the vehicle at time (t). Specifically, in certain embodiments, the Q(t) equation is used to update the new distribution of targeted vehicle $x_t$ at time t, based on its own previous distribution $x_{(t-1)}$ at time t−1, and new observation by reporting vehicle $u_t$. In certain embodiments, all the reporting vehicles will iterate and obtain new distributions of detected objects (e.g., targeted vehicles) based on all these inputs. Also in certain embodiments, this new derived distribution will be re-sampled as the new distribution of the targeted vehicle's location.

Also in certain embodiments, the recalculating is performed using the following equation:

$$w_i = \frac{P(z_t | m_t^i)}{\sum_j P(z_t | m_t^j)} \quad \text{(Equation 5)}$$

in which "$w_i$" represents the recalculated weight, and "P" represents respective conditional probabilities at time "t" given each reporting vehicle's observation. Also in certain embodiments, for each vehicle "i" at time "t", "m" represents the conditional probability distribution function of the target vehicle position "z", conditioned on its observation towards all other "landmarks" (e.g., known objects) on the map. Also in certain embodiments, this recalculation is similar to the original calculation of the weights described above, exception this is the summation of all vehicles (i=1 . . . n). In certain embodiments, Equation 5 is utilized to recalculate the latest weight for each individual reporting vehicle's observation. Accordingly, in various embodiments, the resampling process occurs and a newer distribution is generated based individual's contribution. As a result, in various embodiments, in this iterative process, some reporting vehicles will become "winners", gaining more weight because its prediction match reality better. Similarly, also in various embodiments, some reporting vehicles will become "losers", due to inaccurate prediction of its distribution (and therefor losing weight). Accordingly, in various embodiments, this equation is used to provide the weight update.

In various embodiments, these actions are performed by one or more processors (e.g., via the processor 132 of the vehicle 100 of FIG. 1, and/or from a non-depicted processor of the second vehicle 202, the infrastructure 203, and/or the remote server 218 of FIG. 2).

Figure 6:
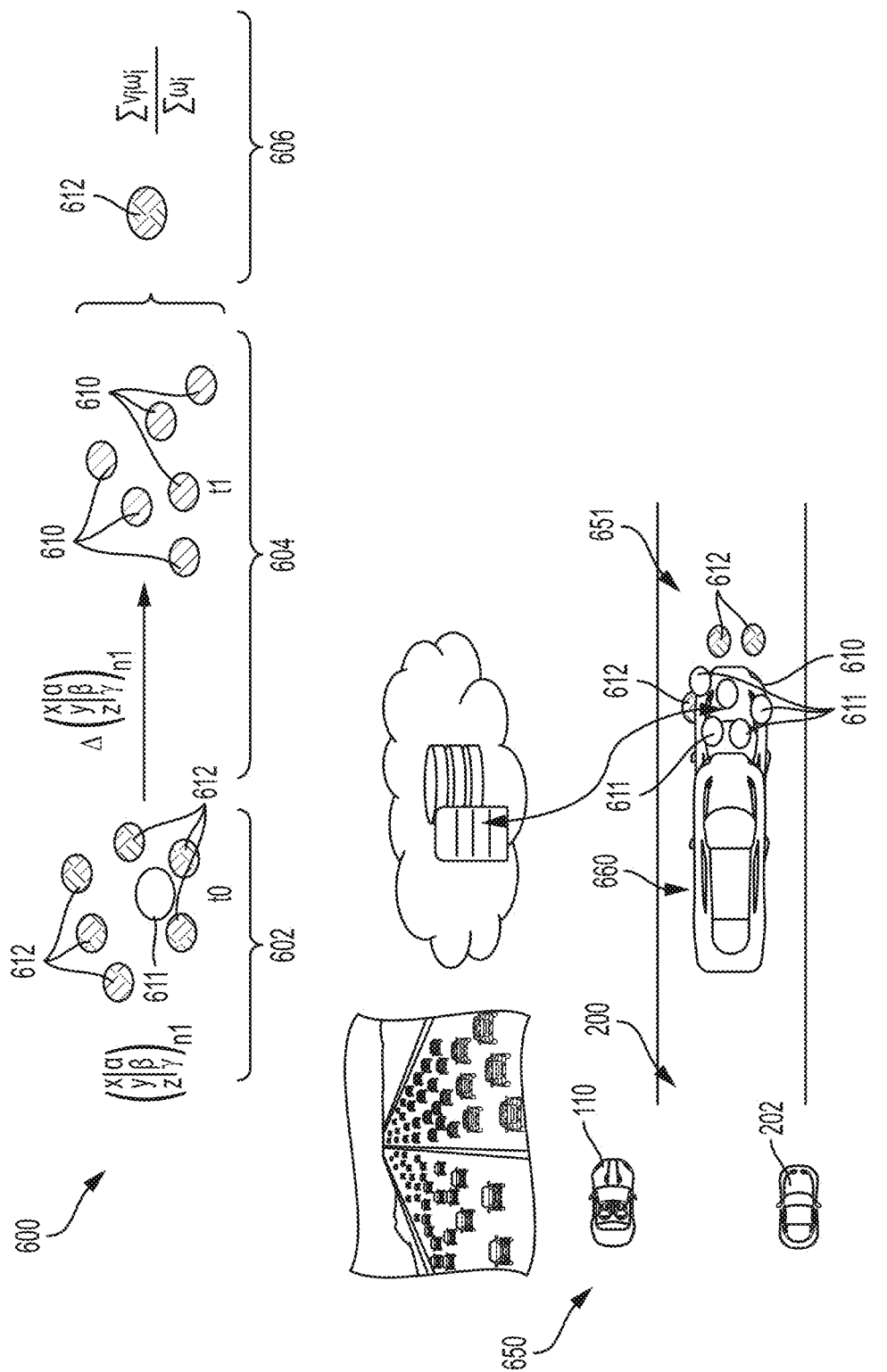
FIG. 6 provides an illustration of another sequence of steps of the process of FIG. 3; specifically, pertaining to the generation of a dynamic time-evolving particle filter graph using the camera data.

With reference to FIG. 6, in accordance with various embodiments, the evolving particle filter graph is demonstrated with first and second illustrations 600 and 650. First, with reference to the first illustration 600, the initial individual probability distributions for the vehicles 100, 202 are illustrated with reference number 602 (e.g., at a first time, to). As shown in illustration 600, individual probability distributions 602 include various visible objects 610, including first objects 611 that are visible by the first vehicle 100 (e.g., by cameras 102 of the first vehicle 100) and second objects 612 that are visible by the second vehicle 202 (e.g., by cameras of the second vehicle 202) (in various embodiments, such objects may be visible by both vehicles 100). Also in certain embodiments, similar to the discussions above, the individual probability distributions 602 may include probability distributions in a similar manner for the infrastructure 203, and so on. Also, as depicted in the first illustration 600, the individual probability distributions 602 are updated based on additional data at a subsequent point in time (e.g., at a second time $t_0$), to generate updated individual probability distributions 604 (e.g., also corresponding to steps 332, 334 as well as step 336, in certain embodiments). In various embodiments, the updated individual probability distributions 604 are then merged together (e.g., corresponding to steps 338-344) to generate a global probability distribution 606.

Second, with reference to the second illustration 650, a global probability distribution 651 (also of step 344) is shown in another format, including a graphical depiction 660 of one of the detected objects 610 (comprising another vehicle) in proximity to the roadway 200 of FIG. 2 and the first and second vehicles 100, 202 of FIGS. 1 and 2. As shown, the global probability distribution 651 includes various observations of the detected object/vehicle, including first detected objects 611 from the first vehicle 100 and second detected objects 612 from the second vehicle 202. In addition, in various embodiments, the global probability distribution 651 is updated based on resampling of data and corresponding recalculation of the results using an iterative process from collaborative cameras (e.g., corresponding to the resampling and recalculation discussed above in connection with step 344). Also in certain embodiments, similar to the discussions above, the global probability distribution 651 also includes various observations of detected objects from the infrastructure 203, and so on.

Once the dynamic time-evolving particle filter graph is generated, the situation awareness of the vehicles is updated in accordance with the dynamic time-evolving situation awareness graph (step 346). In various embodiments, estimated parameters for the detected objects 204, 206 (e.g., estimated locations, distances, and angles from the respective vehicles 100, 202) are updated using the time-evolving particle filter graph. Also in various embodiments, a trajectory of the detected objects is predicted using the dynamic time-evolving situational awareness graph. In various embodiments, the process then proceeds to step 350 (discussed directly below), in which the vehicle 100 is controlled at least in part based on the dynamic time-evolving particle filter graph.

During step 350, the vehicle 100 is controlled at least in part based on one or more of the graphs of steps 317, 328, and/or 344. In certain embodiments, the vehicle 100 is controlled using the global static graph of step 317, the dynamic time-evolving situation awareness graph of step 328, and the dynamic time-evolving particle filter graph of step 344. In certain other embodiments, one or two of the dynamic time-evolving situation awareness graph of step 328, and the dynamic time-evolving particle filter graph of step 344 may be utilized. Also in certain embodiments, the estimates of steps 317, 329, and/or 346 are utilized for controlling the vehicle 100 in step 350. In certain embodiments, one or more vehicle 100 actions (e.g., automatic braking, automatic steering, and so on) are controlled using the above graphs and estimates (and associated data) to avoid objects (e.g., to avoid other vehicles and/or other types of objects). In certain embodiments, one or more warnings, depictions of situation surroundings (e.g., of the detected objects) and the like are provided, for example via the display 108 of FIG. 1. Also in certain embodiments, one or more other vehicles (such as the second vehicle 202 of FIG. 2) may similarly be controlled using such information. Also in certain embodiments, these actions are provided via instructions provided by one or more processors (e.g., via the processor 132 of the vehicle 100 of FIG. 1, and/or from a non-depicted processor of the second vehicle 202, the infrastructure 203, and/or of the remote server 218 of FIG. 2).

Accordingly, the systems, vehicles, and methods thus provide for potentially improved situation awareness and control of vehicles, for example when certain objects may be occluded or blocked with respect to a camera of the vehicle. For example, in various embodiments, camera data from different vehicles and/or infrastructure is used to generate one or more global static graphs, dynamic time-evolving situation awareness graphs, and/or dynamic time-evolving particle filter graph when a vehicle is travelling in proximity to one or more other vehicles along a roadway.

It will be appreciated that the systems, vehicles, and methods may vary from those depicted in the Figures and described herein. For example, the vehicle 100, the cameras 102, the control system 104, the navigation system 106, the display 108, and/or components thereof of FIG. 1, and/or the additional vehicle 202, wireless networks 216, remote servers 218, and/or implementations of FIG. 2, may vary in different embodiments. It will similarly be appreciated that the steps of the process 300 may differ from those depicted in FIG. 3, and/or that various steps of the process 300 may occur concurrently and/or in a different order than that depicted in FIG. 3, in various embodiments, and that likewise the illustrations of FIGS. 4-6 may also vary in different embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method comprising:
   obtaining first camera images from a first camera onboard a first vehicle;
   generating, via one or more computer processors, a first situation awareness graph with respect to objects near the first vehicle, using the first camera images;
   obtaining second camera images from a second camera of a second device that is in proximity to the first vehicle;
   generating, via one or more computer processors, a second situation awareness graph with the respect to the objects, using the second camera images; and
   generating, via one or more computer processor, a global situation awareness graph with respect to the objects, by merging the first situation awareness graph with the second situation awareness graph, using respective first and second weights for the first and second situation awareness graphs;
   wherein the step of generating the global situation awareness graph comprises generating, via one or more computer processors, a multi-layer dynamic probabilistic graph for predicting the trajectory of detected objects, using initial and posterior probabilities from the first situation awareness graph and the second situation awareness graph over multiple periods of time, utilizing a Bayesian particle filter.

2. The method of claim 1, wherein:
   the step of generating the first situation awareness graph comprises generating a first static situation awareness graph with respect to objects near the first vehicle at a particular time, using the first camera images;
   the step of generating the second situation awareness graph comprises generating a second static situation awareness graph with respect to the objects at the particular time, using the second camera images; and
   the step of generating the global situation awareness graph comprises generating a static global situation awareness graph with respect to the objects at the particular time, by merging the first static situation awareness graph with the second static situation awareness graph, using respective first and second weights for the first and second static situation awareness graphs.

3. The method of claim 2, wherein the step generating the static global situation awareness graph comprises generating the static global situation awareness graph using the respective first and second weights for the first and second static situation awareness graphs based on a principal components analysis of respective Mahalanobis Distances from the first and second static situation awareness graphs.

4. The method of claim 1, wherein the step of generating the global situation awareness graph comprises generating, via one or more computer processors, a time-evolving dynamic global situational awareness map with respect to the objects using the first situation awareness graph and the second situation awareness graph over multiple periods of time, using respective first and second weights for the first and second situation awareness graphs.

5. The method of claim 1, wherein the step of generating the global situation awareness graph comprises generating, via one or more computer processors, a multi-layer dynamic bipartite graph for predicting the trajectory of detected objects, using the first situation awareness graph and the second situation awareness graph over multiple periods of time, using respective first and second weights for the first and second situation awareness graphs.

6. The method of claim 1, wherein the second device comprises a second vehicle that is in proximity to the first vehicle.

7. The method of claim 6, further comprising:
   estimating, via one or more processors, one or more parameters as to one or more occluded vehicles of the detected objects, based on the global situation awareness graph; and
   controlling the first vehicle, the second vehicle, or both, in a manner to avoid contact with the one or more occluded vehicles, using the one or more parameters that were estimated based on the global situation awareness graph.

8. The method of claim 1, wherein the second device comprises infrastructure that is in proximity to the vehicle.

9. A system comprising:
   a first camera onboard a first vehicle, the first camera configured to generate first camera images from the first vehicle; and
   one or more computer processors configured to at least facilitate:
      generating a first situation awareness graph with respect to objects near the first vehicle, using the first camera images; and
      generating a global situation awareness graph with respect to the objects, by merging the first situation awareness graph with a second situation awareness graph that was generated using second camera images from a second camera of a second device that is in proximity to the first vehicle, using respective first and second weights for the first and second situation awareness graphs;

wherein the one or more processors are configured to at least facilitate generating a multi-layer dynamic bipartite graph for predicting the trajectory of detected objects, using the first situation awareness graph and the second situation awareness graph over multiple periods of time, using respective first and second weights for the first and second situation awareness graphs.

10. The system of claim 9, further comprising:
a transceiver configured to receive the second camera images from the second device, the second situation awareness graph, or both.

11. The system of claim 10, wherein the second device comprises a second vehicle that is in proximity to the first vehicle, and the transceiver is further configured to transmit, via instructions from the one or more computer processors, the first camera images, the first situation awareness graph, or both, for use by the second vehicle.

12. The system of claim 9, wherein the one or more processors are configured to at least facilitate:
generating a first static situation awareness graph with respect to objects near the first vehicle at a particular time, using the first camera images;
generating a second static situation awareness graph with respect to the objects at the particular time, using the second camera images; and
generating a static global situation awareness graph with respect to the objects at the particular time, by merging the first static situation awareness graph with the second static situation awareness graph, using respective first and second weights for the first and second static situation awareness graphs.

13. The system of claim 12, wherein the one or more processors are configured to at least facilitate generating the static global situation awareness graph using the respective first and second weights for the first and second static situation awareness graphs based on a principal components analysis of respective Mahalanobis Distances from the first and second static situation awareness graphs.

14. The system of claim 9, wherein the one or more processors are configured to at least facilitate generating a time-evolving dynamic global situational awareness map with respect to the objects using the first situation awareness graph and the second situation awareness graph over multiple periods of time, using respective first and second weights for the first and second situation awareness graphs.

15. A system comprising:
a first camera onboard a first vehicle, the first camera configured to generate first camera images from the first vehicle; and
one or more computer processors configured to at least facilitate:
generating a first situation awareness graph with respect to objects near the first vehicle, using the first camera images;
generating a global situation awareness graph with respect to the objects, by merging the first situation awareness graph with a second situation awareness graph that was generated using second camera images from a second camera of a second device that is in proximity to the first vehicle, using respective first and second weights for the first and second situation awareness graphs; and
generating a multi-layer dynamic probabilistic graph for predicting the trajectory of detected objects, using initial and posterior probabilities from the first situation awareness graph and the second situation awareness graph over multiple periods of time, utilizing a Bayesian particle filter.

* * * * *